United States Patent
Wyss et al.

(10) Patent No.: US 6,706,308 B2
(45) Date of Patent: Mar. 16, 2004

(54) PROCESS FOR THE MANUFACTURE OF AN EVAPORATED MILK SUBSTITUTE

(75) Inventors: Heinz Wyss, Oberdiessbach (CH); Hans Engel, Einigen (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 10/077,089

(22) Filed: Feb. 15, 2002

(65) Prior Publication Data

US 2002/0098273 A1 Jul. 25, 2002

Related U.S. Application Data

(63) Continuation of application No. PCT/EP99/06091, filed on Aug. 17, 1999.

(51) Int. Cl.⁷ ................................................. A23C 9/00
(52) U.S. Cl. ........................ 426/587; 426/492; 426/519; 426/522
(58) Field of Search .................................. 426/130, 491, 426/492, 519, 520, 521, 522, 580, 583, 586, 587

(56) References Cited

U.S. PATENT DOCUMENTS

| 5,223,299 A | 6/1993 | Dalan et al. ............... 426/587 |
| 5,366,751 A | 11/1994 | Pordy ........................ 426/580 |
| 5,480,670 A | 1/1996 | Pordy ........................ 426/580 |
| 5,906,847 A | 5/1999 | Engel et al. ................ 426/271 |

FOREIGN PATENT DOCUMENTS

| EP | 0 627 169 B1 | 12/1994 |
| SU | 655 377 | 4/1979 |

*Primary Examiner*—Leslie Wong
(74) *Attorney, Agent, or Firm*—Winston & Strawn LLP

(57) ABSTRACT

Process for the manufacture of a an evaporated milk product from a whey product, in which the whey is optionally partially substituted with lactose. The whey is added in the form of an aqueous solution to fresh whole milk, having the advantage of avoiding or of reducing the presence of free calcium ions in the solution which are capable of destabilizing the casein micelle. The process includes the dissolution of the whey product in an aqueous medium, mixing with fresh milk, ensuring heat stability for the product in spite of the presence, in a substantial quantity, of whey proteins, then concentrating the mixture by evaporation, leading to a product whose taste is similar to that of fresh milk.

13 Claims, No Drawings

PROCESS FOR THE MANUFACTURE OF AN EVAPORATED MILK SUBSTITUTE

CROSS-REFERENCE TO RELATED APPLICATIONS

This application is a continuation of the US national stage designation of International application PCT/EP99/06091 filed Aug. 17, 1999, the contents of which is expressly incorporated herein by reference thereto.

TECHNICAL FIELD

The present invention relates to a process for the manufacture of an evaporated milk substitute which can be used as a dairy coffee whitener. It is based on whole milk which is partially substituted with whey and/or lactose and wherein, if desired, the lactic fat may be partially replaced with vegetable fat.

The use of whey is known in the manufacture of reconstituted dairy products. The advantage of using whey as a partial substitute for milk is essentially linked to its low price. However, the use of whey even as a partial replacement for milk is a delicate operation. It is indeed difficult to offer the product heat stability and a good shelf life with whey proteins. Another problem which is difficult to solve is to preserve the organoleptic qualities of the fresh milk in such a product, that is to say attenuate and if possible avoid the presence of a cooked flavor normally associated with the concentration of milk by evaporation.

European Patent Application EP 0,627,169 relates to a process for packaging milk which makes it possible to partially achieve these set objectives. In the context of this patent application, the product to be packaged may be in the form of a whole milk, partially skimmed milk, skimmed milk or whey. The process comprises one stage, but this method present certain disadvantages. In particular, the packaging process does not make it possible to avoid sedimentation after packaging, in particular when the product is sterilized. Furthermore, a cooked flavor is evident.

European Patent Application EP 0,832,565 relates to a milk substitute containing an appreciable quantity of whey proteins in which the storage properties are satisfactory. The process of preparation is based on a sequential dissolution of the whey proteins, and then of milk with no evaporation stage as it is a recombination. It is not possible in this case to preserve the organoleptic qualities close to those which characterize fresh milk.

The present invention now seeks to overcome these deficiencies.

SUMMARY OF THE INVENTION

The present invention relates to a process for the preparation of an evaporated milk product whose organoleptic qualities are similar to those of fresh milk. This process includes the steps of mixing a whey product with fresh whole milk to form a lactic solution; pasteurizing and concentrating the lactic solution to form a concentrate; thermally treating and homogenizing the concentrate; and cooling, packaging and sterilizing the concentrate as the evaporated milk product.

Preferably, the lactic solution is concentrated by evaporation, and the whey product includes up to 50% by weight of lactose. The whey product can be formed by dissolving whey solids in an aqueous medium in which free $Ca^{2+}$ ions are buffered with a calcium-sequestering agent. Alternatively, the whey product can be formed by dissolving, in a first stage, whey solids in an aqueous medium that includes carrageenan and a calcium-sequestering agent at a temperature of about 30 to 65° C. for a time sufficient to allow the whey solids to moisten, and mixing the milk and the whey product in a second stage.

The whey solids are allowed to moisten for a time period of 10 min to 4 h, and the milk and the whey product are mixed together at a temperature of about 30 to 65° C. Dissolution of the carrageenan and sequestering agent may take place batchwise, in that the carrageenan is first dissolved in cold water, and the sequestering agent is dissolved separately before being placed in a vessel containing all the water and comprising a mixer, with moderate stirring at a temperature of about 60 to 65° C. Alternatively, the dissolution of the whey solids in the aqueous solution can take place in a vessel batchwise by recirculation of the aqueous solution through a powder dispenser that delivers whey powder.

DETAILED DESCRIPTION OF THE PREFERRED EMBODIMENTS

The present invention relates to a process for the preparation of an milk product in the form of a substitute evaporated milk whose organoleptic qualities are similar to those of fresh milk. Preferably, a liquid whey product is mixed with fresh whole milk and then the mixture is pasteurized, it is concentrated by evaporation, heated and then the concentrate is thermally treated, the thermally treated concentrate is homogenized, it is cooled, it is packaged and the packaged product is sterilized.

According to a variant of the process, applicable in particular to fresh whole milk, an additional homogenization of the concentrate is carried out before heating it and treating it thermally.

The product obtained contains a substantial portion of whey as a replacement for the milk in the composition of the milk substitute. This substitution allows a substantial reduction in the cost of the raw materials used. It also has the advantage that the substitute raw material is of a lactic origin. The whey can be partially substituted and preferably up to an amount of approximately half with lactose. In the text which follows, in the context of the present patent application, the term "whey product" will comprise the concepts of whey and whey supplemented with lactose, it being possible for the whey to in fact be demineralized to a greater or lesser degree.

Although the whey is present in large proportions in the milk substitute, and thus the whey proteins, the heat stability of the product is not reduced as a result, which is unexpected. Thus, at high temperatures, the milk substitute substantially reacts like normal milk packaged by conventional processes from the point of view of the color, taste and consistency.

Moreover, the milk substitute has no or few calcium ions capable of precipitating to form an undesirable deposit. Indeed, the free calcium ions are either buffered with the sequestering agent which is at least partially dissociated, or are alternatively bound in the casein micelles. In order to promote the low presence of calcium ions in the milk substitute, it is in addition appropriate to use deionized or demineralized water in its composition.

The sequestering agent or stabilizing salt is preferably a phosphate or citrate, for example mono-, di- or trisodium phosphate or mono-, di- or trisodium citrate or mixtures thereof.

To prepare the milk substitute, the following quantities by weight of raw materials are preferably used: about 10 to 12% of fresh whole milk solids, about 5 to 9% of whey powder, about 7 to 10% of lactic or vegetable fat which may be any vegetable fat and is preferably selected from palm oil, coconut oil, maize oil or a combination of the latter.

Furthermore, there is required preferably about 0.1 to 0.3% of lecithin, about 0.02 to 0.03% of carrageenan, about 0.10 to 0.15% of sequestering agent for the dissolution and about 0 to 0.15% of sequestering agent for the sterilization, and about 68 to 80% of deionized water or preferably demineralized water.

An advantage of this process is that it makes it possible to guarantee in the finished product a temperature stability comparable to that of milk in spite of the substantial presence of whey proteins.

Before starting to dissolve the whey powder, it is necessary to prepare the aqueous dissolution medium. This solution comprises, by weight, about 68 to 80% of water, about 0.01 to 0.03% of carrageenan and about 0.1 to 0.15% of sequestering agent. The sequestering agent and the carrageenan may be incorporated into the water at a temperature of 30 to 65° C., preferably at about 60 to 65° C. in a first vessel in two ways: by recirculation of the water through a powder dispenser supplying the sequestering agent and the carrageenan, or alternatively, by separate predissolution of the carrageenan and the sequestering agent in a small quantity of water before mixing them with all the water with moderate stirring in order to form the aqueous dissolution medium.

Two methods may be envisaged for incorporating the whey powder into the aqueous solution present in the first vessel at 30 to 65° C., preferably at about 60 to 65° C. The solution is recirculated through a powder dispenser with the whey powder, or alternatively the powder is added directly to the solution and dissolved with vigorous stirring.

After the dissolution of the whey in the aqueous medium, it is necessary to allow the whey solution thus obtained to stand for 10 min to 4 h, preferably for 10 to 45 min at a temperature of about 40 to 65° C. This standing time is necessary to allow the rehydration of the whey proteins.

Once the rehydration of the proteins has occurred, the whey solution can be mixed with the fresh whole or partially skimmed milk. Starting with fresh milk, the cooked flavor generally associated with concentration by evaporation is avoided.

Before proceeding to the remainder of the operations, the lactic solution should be preheated, preferably to about 60° C. in order to be able to incorporate therein the fats, in particular the butter oil and/or the vegetable oils, in the presence of lecithin. The oils as well as the lecithin are mixed and preheated to about 60 to about 65° C. The fatty phase is then integrated into the lactic solution and mixed, preferably with the aid of a static mixer or of a colloid mill. To ensure equilibration of the solution, it is allowed to stand. The standing period is preferably about 25 to 35 min if the operation is carried out in a vessel or 15 to 20 min if the milk is mixed on-line.

Following these operations, pasteurization of the solution, which can take two forms, is carried out. An indirect pasteurization for about 1 to 60 s, at about 80 to 85° C., may be carried out for example by means of a tubular or plate exchanger.

After the pasteurization, the solution is concentrated by evaporation in a falling film and multiple-effect evaporator to a dry matter content of about 28% by weight. The concentrate is cooled in the evaporator to about 35–40° C.

The concentrate is then preheated to about 75° C., it is then thermally treated at about 80 to 85° C., by indirect treatment, for example by means of a tubular or plate exchanger for 1 to 30 s, or by direct treatment for about 3 to 5 s at about 120 to 130° C. by direct injection of steam. This heat treatment may be preferably followed by a flash decompression at about 70 to 80° C.

In the case where the whey product is dissolved directly in the whole milk, the thermally treated concentrate is preferably subjected to a two-stage homogenization which may be carried out at a temperature of about 70 to 75° C. The first stage is at a pressure of about 190 to 210 bar, the second is at about 30 to 50 bar.

According to a variant which is preferably applicable to the case where fresh whole milk in which the whey is directly dissolved is used as starting material, an additional homogenization of the concentrate is carried out prior to or after the preheating, and before the heat treatment.

The temperature of the thermally treated concentrate is advantageously reduced to about 4 to 8° C. A sample is removed so as to carry out the sterilization tests from which the quantities of water and of stabilizing salt (sequestering agent) to be added to the solution are determined. The stabilizing salt, which is optionally used, can be present in an amount of up to about 0.15% by weight, and is then dissolved in the water and incorporated into the lactic solution in order to ensure standardization of the solution.

Finally, the containers intended for sale are filled with the milk substitute thus obtained, ensuring that an empty space is left above the level of the liquid so as to make it possible to stir the content of the container before use. The sterilization is preferably carried out for about 12 to 15 min at about 115 to 122° C. after having preheated the product to about 95 to 97° C.

EXAMPLES

The examples below illustrate the invention. In these examples, the percentages and parts are by weight, unless otherwise indicated.

Example 1

The carrageenan and 50% of disodium hydrogen phosphate, as sequestering agent, are dissolved in a first vessel containing deionized water at 65° C. by recirculating the water through a powder dispenser containing the two abovementioned ingredients. A sweet whey powder from cheesemaking is dissolved in the same manner by recirculation of the same water supplemented with carrageenan and sequestering agent by the same powder dispenser containing, this time, the whey powder, so as to obtain a solution containing 0.02% of carrageenan, 0.1% of disodium hydrogen phosphate and 20% of solids. To allow the rehydration of the whey proteins, it is important to allow the solution thus obtained to stand for about thirty minutes at 60° C.

The whey solution is mixed with fresh whole milk at 20° C. in a second vessel with stirring in order to ensure good mixing. The proportions are 10.5% of fresh skimmed milk solids per 7% of sweet whey powder in the water.

The next step consists in incorporating the lecithin and the palm oil into the lactic solution. For that, the solution is heated at 65° C. Separately, the lecithin is mixed with the palm oil and the mixture is heated to 65° C. The quantity of mixture used corresponds to the quantity of lactic fat which was removed in replacing a portion of whole milk with sweet whey. The fatty phase, representing 7.5% including 0.2% of lecithin, is mixed with the lactic solution on-line with the aid of a static mixer.

An indirect pasteurization is then carried out at 85° C. for 30 s before subjecting the lactic solution to evaporation in a falling film and triple-effect evaporator to a dry matter content of 28%, the temperature of the concentrate at the outlet of the evaporator being 35–40° C. The concentrate is then subjected to preheating at 75° C., to a direct heat treatment at 105° C. for 5 s by injection of steam, followed by a flash decompression and to a two-stage homogenization, in the first at 70° C. at a pressure of 200 bar, and then in the second at 30 bar at the same temperature.

To test the sterilization, the lactic solution is cooled to 6° C. On the basis of the sterilization test, the solution is standardized to 25% dry matter content with demineralized water containing, in dissolved form, the necessary quantity of sequestering agent. To ensure good dispersion of the sequestering agent, the solution should be well mixed before passing to the next stage.

Tins are then continuously filled with the lactic solution and in a standard manner, leaving an empty space between the liquid and the tin cover. After the filling phase, the product is preheated to 95° C. and then it is sterilized in its packaging at 118° C. for 12 min. The tinned milk substitute thus obtained is ready for sale.

Example 2

This example relates to a milk substitute prepared from whole milk. Disodium hydrogen phosphate is dissolved in the milk, standardized to 7.5% fat by addition of cream and lecithin, and then carrageenan is added thereto until complete dissolution is obtained. Sweet whey powder is then mixed in and the mixture is maintained stirring for 10 h so as to obtain complete hydration of the whey proteins.

All the stages of the process are similar to those of Example 1, apart from the fact that directly after the evaporation, that is to say before the preheating and the heat treatment, the concentrate is subjected to a first homogenization (in addition to that carried out after the heat treatment in Example 1) at 200 bar, and then 30 bar and that the heat treatment which follows takes place at 135° C. for 5 s.

Example 3

The procedure is carried out as in Example 2, apart from the fact that the homogenization takes place between the preheating and the heat treatment, and that the heat treatment is carried out at 105° C. for 5 s.

What is claimed is:

1. A process for the preparation of an evaporated milk product whose organoleptic qualities are similar to those of fresh milk, which comprises:

mixing a whey product with fresh whole milk to form a lactic solution;

pasteurizing and concentrating the lactic solution to form a concentrate;

thermally treating and homogenizing the concentrate; and cooling, packaging and sterilizing the concentrate as the evaporated milk product, wherein the fresh whole milk is present in an amount sufficient to provide organoleptic qualities which characterize fresh milk.

2. The process of claim 1, wherein the lactic solution is concentrated by evaporation.

3. The process of claim 1, wherein the whey product includes up to 50% by weight of lactose.

4. The process of claim 1, which further comprises forming the whey product by dissolving whey solids in an aqueous medium in which free $Ca^{2+}$ ions are buffered with a calcium-sequestering agent.

5. The process of claim 1, which further comprises forming the whey product by dissolving, in a first stage, whey solids in an aqueous medium that includes carrageenan and a calcium-sequestering agent at a temperature of about 30 to 65° C. for a time sufficient to allow the whey solids to moisten, and mixing the milk and the whey product in a second stage.

6. The process of claim 5, wherein the whey solids are allowed to moisten for a time period of 10 min to 4 h, and the milk and whey product are mixed together at a temperature of about 30 to 65° C.

7. The process of claim 5, wherein the dissolution of the carrageenan and sequestering agent takes place batchwise, in that the carrageenan is first dissolved in cold water, the sequestering agent is dissolved separately before being placed in a vessel containing all the water and comprising a mixer, with moderate stirring at a temperature of about 60 to 65° C.

8. The process of claim 5, wherein the dissolution of the whey solids in the aqueous solution takes place in a vessel batchwise by recirculation of the aqueous solution through a powder dispenser that delivers whey powder.

9. The process of claim 1, wherein fats are incorporated in the lactic solution in the presence of lecithin at a temperature of 60 to 65° C.

10. The process of claim 9, wherein the fats include butter oil or vegetable oils.

11. The process of claim 1, wherein the concentrate is subjected to a two-stage homogenization at a temperature of 70 to 75° C., the first stage being at a pressure of 190 to 210 bar and the second at about 30 to 50 bar.

12. The process of claim 1, wherein fresh whole milk is used as starting material, the whey product is dissolved directly in the milk and in that an additional homogenization of the concentrate is carried out prior to or after the thermal treatment.

13. The process of claim 1, wherein up to 0.15% by weight of sequestering agent is added to the thermally treated and homogenized concentrate, in that containers are then filled with the evaporated milk product, and in that the filled containers are hermetically closed, preheated to 95–97° C. and then sterilized for 12 to 15 min at 115–122° C.

* * * * *